(12) United States Patent
Tokai

(10) Patent No.: US 8,484,197 B2
(45) Date of Patent: Jul. 9, 2013

(54) SEARCH APPARATUS, SEARCH METHOD, AND COMPUTER READABLE MEDIUM

(75) Inventor: Kiwame Tokai, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/362,837

(22) Filed: Jan. 31, 2012

(65) Prior Publication Data

US 2013/0080476 A1    Mar. 28, 2013

(30) Foreign Application Priority Data

Sep. 22, 2011    (JP) .................................. 2011-207440

(51) Int. Cl.
*G06F 17/30*    (2006.01)
(52) U.S. Cl.
USPC .......................................................... 707/716
(58) Field of Classification Search
USPC .................................. 707/2, 3, 716; 709/223
See application file for complete search history.

(56) References Cited

U.S. PATENT DOCUMENTS

2007/0005750 A1*    1/2007    Lunt et al. ..................... 709/223

FOREIGN PATENT DOCUMENTS

JP    2006-209431 A    8/2006

OTHER PUBLICATIONS

Japanese Unexamined Patent Application Publication No. 2006-209431.

* cited by examiner

*Primary Examiner* — Etienne Leroux
(74) *Attorney, Agent, or Firm* — Sughrue Mion, PLLC

(57)    ABSTRACT

A search apparatus includes a graph memory, a root node specification receiving unit, and a search unit. The graph memory stores data of a graph having nodes representing data elements and a link representing a relationship between the data elements. The root node specification receiving unit receives a root node specified from among the nodes in the graph. The search unit searches for an adjacent node which is connected to a target node via a link and which satisfies a search condition that at least one of the target node and the adjacent node has a predetermined attribute. The search unit searches for an adjacent node using the root node as the target node. The search unit iteratively performs a process of searching for an adjacent node using a previously determined adjacent node as the target node for a subsequent iteration to obtain a concatenation of adjacent nodes.

13 Claims, 8 Drawing Sheets

FIG. 5

| SUBJECT (NODE) | PREDICATE (LINK) | OBJECT (NODE) |
|---|---|---|
| YOU | ARE A COLLEAGUE OF | ACQUAINTANCE 1 |
| YOU | PARTICIPATE IN | MEETING A |
| ACQUAINTANCE 1 | IS A COLLEAGUE OF | SOMEONE a |
| SOMEONE a | PARTICIPATES IN | MEETING B |
| Psn1 | PARTICIPATES IN | MEETING B |
| Psn1 | CREATES | Doc1 |
| Psn1 | BELONGS TO | ORGANIZATION C |
| SOMEONE b | BELONGS TO | ORGANIZATION C |
| SOMEONE b | PARTICIPATES IN | MEETING A |
| YOU | Rdf:type (ARE A MEMBER OF CLASS xxx) | Foaf:Person (NUMBER OF PERSONS) |
| ACQUAINTANCE 1 | Rdf:type (ARE A MEMBER OF CLASS xxx) | Foaf:Person (NUMBER OF PERSONS) |
| SOMEONE a | Rdf:type (ARE A MEMBER OF CLASS xxx) | Foaf:Person (NUMBER OF PERSONS) |
| ⋮ | ⋮ | ⋮ |

FIG. 8

| REACH FLAG | HOP COUNT | PATH FROM END POINT NODE |
|---|---|---|
| REACHED | 5 | Doc1, CREATE, Psn1, PARTICIPATE IN, MEETING B, PARTICIPATE IN, SOMEONE a, COLLEAGUE, ACQUAINTANCE 1, COLLEAGUE, YOU |
| REACHED | 5 | Doc1, CREATE, Psn1, BELONG TO, ORGANIZATION C, BELONG TO, SOMEONE b, PARTICIPATE IN, MEETING A, PARTICIPATE IN, YOU |
| NOT REACHED | 2 | Doc1, COMMENT ON, Psn2, COLLEAGUE, Psn3 |
| ... | ... | ... |

SEARCH APPARATUS, SEARCH METHOD, AND COMPUTER READABLE MEDIUM

CROSS-REFERENCE TO RELATED APPLICATIONS

This application is based on and claims priority under 35 USC 119 from Japanese Patent Application No. 2011-207440 filed Sep. 22, 2011.

BACKGROUND (i) Technical Field

The present invention relates to a search apparatus, a search method, and a computer readable medium.

(ii) SUMMARY

According to an aspect of the invention, there is provided a search apparatus including a graph memory, a root node specification receiving unit, and a search unit. The graph memory stores data of a graph having nodes which represent data elements and a link which represents a relationship between the data elements. The root node specification receiving unit receives a root node which is specified from among the nodes in the graph. The search unit searches for an adjacent node which is connected to a target node via a link and which satisfies a search condition that at least one of the target node and the adjacent node has a predetermined attribute. The search unit searches for an adjacent node which satisfies the search condition using the root node as the target node. Further, the search unit iteratively performs a process of searching for an adjacent node which satisfies the search condition using a preceding adjacent node, which satisfies the search condition and which has been determined in a previous search, as the target node for a subsequent iteration to obtain a concatenation of adjacent nodes, and outputs the obtained concatenation of adjacent nodes.

BRIEF DESCRIPTION OF THE DRAWINGS

Exemplary embodiment(s) of the present invention will be described in detail based on the following figures, wherein:

FIG. 5 illustrates an example of data contained in a database;

FIG. 8 illustrates an example of path information determined by the search processing unit.

DETAILED DESCRIPTION

Figure 1A:
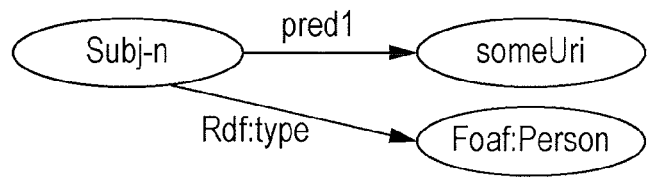
FIG. 1A illustrates a subgraph in which a node having a specific attribute is connected to (or adjacent to) a target node.

There are available methods to describe a graph structure that defines relationships between data elements. One of such methods is Resource Description Framework (RDF) that is a framework for describing relationships between incidents (i.e., resources, including specific incidents and abstract concepts) using sets (called triples) of subject, predicate, and object. In RDF, a graph in which an incident that is a subject or an object is a node and a predicate is a link (or edge) is represented as a set of triples. SPARQL Protocol and RDF Query Language (SPARQL) is an example of a computer language used to search for data written in RDF.

In the following exemplary embodiment, by way of example, a database having data that describes various relationships between incidents in accordance with RDF is searched. RDF is merely an example of a method to represent relationships between incidents, and the following exemplary embodiment may also adopt any database for representing such relationships using a method other than RDF.

The following example is given to facilitate understanding of a technique disclosed in the exemplary embodiment.

It is assumed that a user A has searched a database and has found an electronic document X. However, the user A has no right to access the electronic document X, and is not authorized to read the electronic document X. In this situation, if the user A is acquainted with a person who has the right to access the electronic document X, the user A may ask the person to teach the user A what is contained in the electronic document X. If the user A is not directly acquainted with a person who has the right to access the electronic document X, for example, if a person D, who is a colleague of a person C, who is a colleague of a person B, who is a direct acquaintance of the user A, has the right to access the electronic document X, the user A may take an action, such as asking the person D to teach the user A what is contained in the electronic document X, by contacting the person D through a network of acquaintances such that the user A contacts the person C through the person B and further contacts the person D through the person C.

Further, if a person C who participated in meeting Y in which a person B, who is a direct acquaintance of the user A, participated has the right to access the electronic document X, the person B might possibly contact the person C through a relationship of friendship among participants of the meeting Y regardless of whether or not the person B and the person C are direct acquaintances or colleagues. Therefore, the user A may take an action, such as asking the person C to teach the user A what is contained in the electronic document X, by contacting the person C through the person B.

Accordingly, once a concatenation of relationships between the user A and the electronic document X through a network of acquaintances, colleagues, etc., described above, is found in a database in which various relationships between incidents including persons and abstract concepts, between incidents, and between abstract concepts are described in accordance with RDF, the user A might possibly access the electronic document X while keeping track of persons along the path of the concatenation. This path is a path to which an incident (for example, the person B) having the attribute "is a person" or an incident (for example, the meeting Y in which the person C participated) having a relationship with an incident having the attribute "is a person" is concatenated. It is to be noted that the data "C is a person" is represented as a triple of subject "C", predicate "have an attribute of (object)/is a member of a class of (object)", and object "person".

In this exemplary embodiment, a concatenation path of relationships between incidents that are related to such specific attributes as above is determined in a database that represents a graph structure having a set of relationships between incidents. A description will now be given of an overview of a method for determining the concatenation path.

For example, if the user A wishes to know a concatenation of "persons" who are related to the electronic document X, the user A sets the condition of having the attribute "person" as a search condition for narrowing down path search results in a search apparatus. Conditions may be set by, for example, presenting a list of attributes ("person", "document", "meeting", "organization", etc.) stored in the search apparatus and prompting the user A to select one attribute. The attributes to be stored in the search apparatus may be those belonging to, for example, an RDF vocabulary, or may be those defined individually in the search apparatus.

For example, when a node having the attribute "person" is searched for using SPARQL, the following search statement may be used:

Select ?p where {?p rdf:type foaf:Person.}

In the above statement, "rdf:type" means a property used to state that the resource is a member (instance) of a class, and "rdf:" denotes the namespace used in the RDF model. The detailed specifications of the namespace are summarized in "RDF Vocabulary Description Language 1.0: RDF Schema", World Wide Web Consortium (W3C) Recommendation (see the webpage: www.w3.org/TR/rdf-schema/).

Likewise, "foaf:Person" denotes a resource representing "person". The definition of "foaf:Person" complies with "FOAF Vocabulary Specification 0.9" (see the webpage: xmlns.com/foaf/0.1/).

In a graph database written in RDF, when a specific node (hereinafter referred to as a "target node") is defined as <someUri>, a node having the target node as an object may be searched for using the following search statement:

Select ?n where {?n ?pred <someUri>}

The combination of the above search statements, for example, the search statement below, allows searching for a node (hereinafter represented by "subj-n") having the target node as an object and also having the specific attribute "person". The node subj-n is a node adjacent to the target node <someUri>.

```
<Search statement 1>
    Select ?subj-n where {
    ?subj-n ?pred1 <someUri> .
    ?subj-n rdf:type foaf:Person .
    }
```

The search statement 1 represents a subgraph having nodes and links, as illustrated in FIG. 1A. In FIG. 1A, the nodes are represented by elliptical shapes, and the links are represented by arrows connecting the elliptical shapes. That is, in the subgraph illustrated in FIG. 1A, the node "Subj-n" has, as an object, the resource specified as <someUri>, and also has the attribute "person" (=foaf:Person type). In the search statement 1 described above, the link (predicate) "pred1" is a variable, and therefore any link matches "pred1" (that is, the relationship between "subj-n" and <someUri> is not limited). In the search statement 1 described above, furthermore, the node "Subj-n" is a variable, and a node "Subj-n" that matches the subgraph described above is a search result.

For example, if the electronic document X is written as the resource <someUri> in an RDF database, the resource "Subj-n" has a relationship written as the property "pred1" (which is not limited; for example, "create") with the electronic document X, and further satisfies the condition of being a "person".

In addition, the relationship is not limited to a unidirectional relationship. For example, search statement 2 below allows searching for a node "Subj-n" having the target node as a subject and also having the specific attribute "person":

```
<Search statement 2>
    Select ?subj-n where {
    <someUri> ?pred1 ?subj-n .
    ?subj-n rdf:type foaf:Person .
    }
```

Figure 1B:
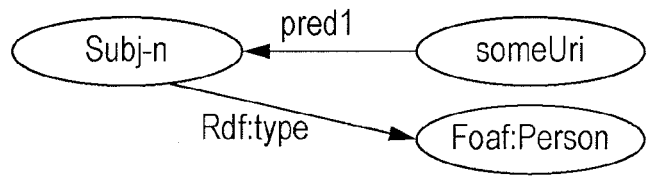
FIG. 1B illustrates a subgraph in which a node having a specific attribute is connected to (or adjacent to) a target node.

The search statement 2 represents a subgraph illustrated in FIG. 1B. For example, if the resource <someUri> represents the electronic document X and "pred1" is the predicate "uploaded", the node "subj-n" represents a person who uploaded the electronic document X.

The node "Subj-n" adjacent to the target node (resource) <someUri> which has been found using any of the search statements 1 and 2 described above represents a "person" having a certain relationship with the target node <someUri>.

Figure 2:
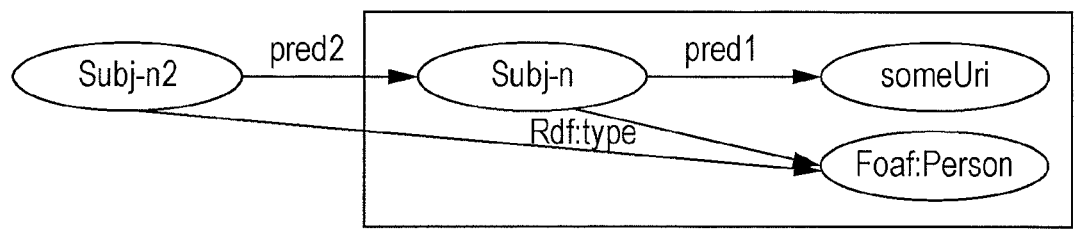
FIG. 2 illustrates a subgraph in which two adjacent nodes having a specific attribute are concatenated together from a target node.

After a search is performed using the search statements 1 and 2 in the above manner, each of adjacent nodes "Subj-n" found as satisfying either the search statement 1 or 2 is handled as the target node <someUri> for the subsequent iteration, and a similar search is repeated. Through the above iterations, a concatenation of nodes having the specific attribute "person" is generated. For example, FIG. 2 illustrates a concatenation "Subj-n-Subj-n2" of nodes which is determined through two iterations. Specifically, FIG. 2 illustrates a concatenation having a person subj-n having a certain relationship pred1 with the target node <someUri> (for example, the electronic document X which the user wants to access), and a person subj-n2 having a certain relationship pred2 with the person subj-n. The relationship (predicate) pred2 represents, for example, a relationship between persons (for example, "is a colleague").

While the search statements 1 and 2 described above represent that an adjacent node adjacent to the target node has the attribute "person", a concatenation may be extended if the target node has the attribute "person" even though the adjacent node does not have the attribute "person". This example is equivalent to, in the first example given above, a concatenation between the person B and the person C, who participated in the same meeting Y, through the meeting Y. Specifically, in a case where the person C (used as the target node) participated in the meeting Y (corresponding to an adjacent node to the target node), the meeting Y is incorporated into the concatenation as the next node to the person C although the meeting Y is not a person. Next time the meeting Y is used as the target node, the person B, which is an adjacent node to the meeting Y, matches the search statement 1 described above, and is incorporated into the concatenation.

Search statements 3 and 4 below (whose directionalities correspond to those of the search statements 1 and 2, respectively) may be used as search statements for examining an adjacent node in a case where the target node has the attribute "person":

```
<Search statement 3>
    Select ?subj-n where {
    ?subj-n ?pred1 <someUri> .
    <someUri> rdf:type foaf:Person .
    }
<Search statement 4>
```

-continued

```
Select ?subj-n where {
  <someUri> ?pred1 ?subj-n .
  <someUri> rdf:type foaf:Person .
}
```

In this manner, a concatenation of nodes that are related to an initially specified target node is created by repeating the following steps: (a) searching for an adjacent node subj-n to the target node <someUri> which satisfies any of the search statements 1 to 4, and (b) using each of the found adjacent nodes as the target node for the subsequent iteration.

In this exemplary embodiment, furthermore, such a concatenation of nodes is presented as a search result as well as an indication of what relationship (link) these nodes have.

Figure 3:
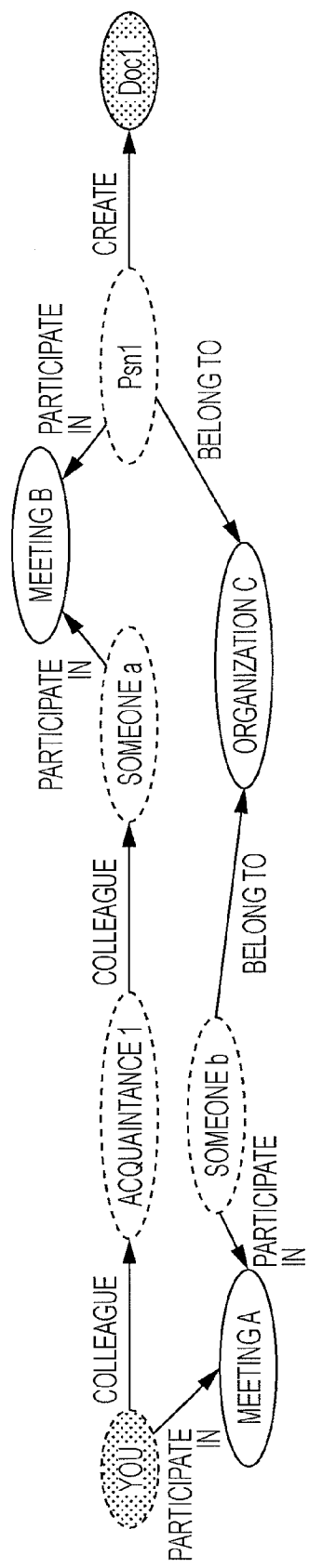
FIG. 3 illustrates an example of a path in which a start point node and an end point node are concatenated together through nodes having a specific attribute ("person")

FIG. 3 illustrates two concatenations of incidents from a person "you" to a document "Doc1" through persons, which are determined by searching a given graph database. In FIG. 3, a node having an attribute "person" is defined as a dashed-line elliptical shape, and a node not having the attribute "person" is defined as a solid-line elliptical shape.

<Concatenation 1>

Person "acquaintance 1", who is a 'colleague' of person "you"→Person "someone a", who is a 'colleague' of the person "acquaintance 1"→Meeting "meeting B", which the person "someone a" 'participated in'→Person "Psn1", who 'participated in' the meeting "meeting B"→Document "Doc1" which the person "Psn1" 'created'

<Concatenation 2>

Meeting "meeting A", which person you 'participated in'→Person "someone b", who 'participated in' the meeting "meeting A" →Organization "organization C", which the person "someone b" 'belongs to' →Person "Psn1", who 'belongs to' the organization "organization C"→Document "Doc1" which the person "Psn1" 'created'

A search apparatus according to this exemplary embodiment presents information about such a concatenation path as above to the user you who has issued a search instruction. Specifically, the search apparatus outputs a concatenation of adjacent nodes as a series of pieces of information about the respective nodes and links and pieces of information about connections between the nodes. Referring to FIG. 3 as an example, the information about the respective nodes and links indicates that nodes correspond to you and "acquaintance" and a link therebetween corresponds to "colleague". The information about connections between nodes indicates that the connection of "you" and "acquaintance" by the relationship "colleague" is indicated by an arrow.

A technique according to this exemplary embodiment has been briefly described. Next, a description will be given of an example configuration of a search apparatus that implements the technique and an example of a processing procedure of the search apparatus.

Figure 4:
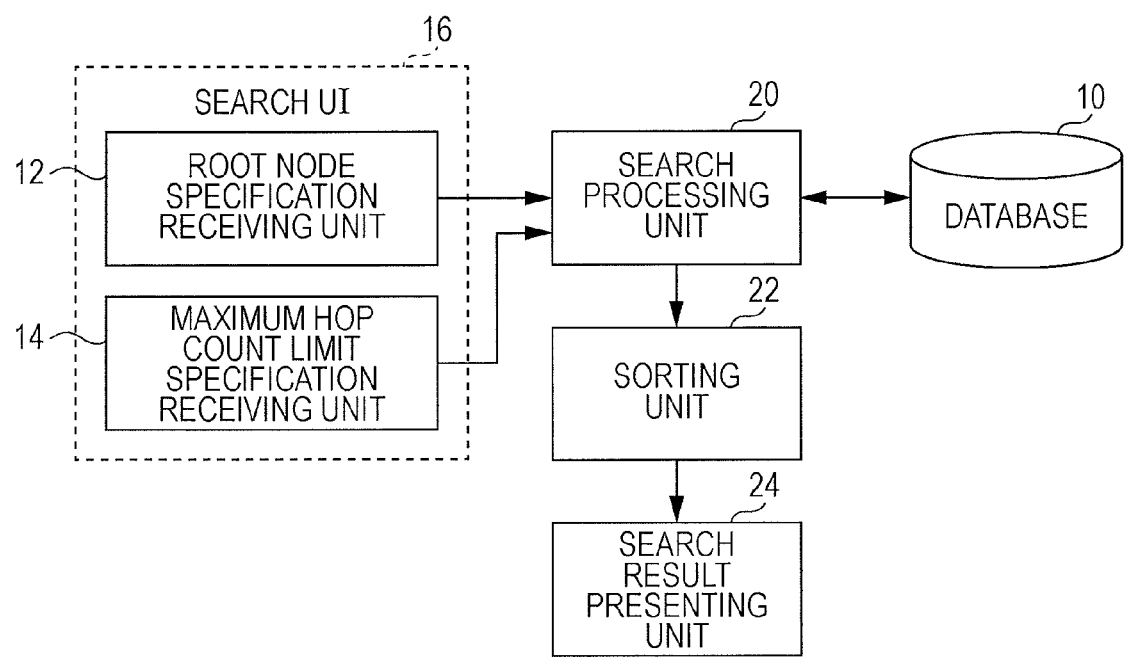
FIG. 4 is a functional block diagram of an example of a search apparatus according to an exemplary embodiment.

FIG. 4 illustrates an example configuration of a search apparatus according to this exemplary embodiment.

In the configuration illustrated in FIG. 4, a database 10 stores graph data representing a graph structure that defines relationships between data elements. The following description will be given in the context of a representation of relationships between data elements using RDF, by way of example; however, the search technique according to this exemplary embodiment may also be applied to a method other than RDF.

FIG. 5 illustrates an example of the graph data stored in the database 10. The data illustrated by way of example in FIG. 5 includes plural "triples" of subject, predicate, and object. The graph data illustrated by way of example in FIG. 5 represents the graph illustrated in FIG. 3. However, the data format illustrated by way of example in FIG. 5 is merely an example, and any data format capable of describing relationships between data elements, other than that illustrated by way of example in FIG. 5, may be used.

Referring back to FIG. 4, the database 10 may be included in a computer having a function for performing a graph search, such as a search processing unit 20 described below, or may be included in another computer connected to the computer via a network such as the Internet.

A root node specification receiving unit 12 receives root nodes specified by a user as one specified item used for searching. The root nodes are nodes at the endpoints of a concatenation path that the user wishes to search for. In the example illustrated in FIG. 3, "you", which is the start point node of the path, and "Doc1", which is the end point node of the path, correspond to the root nodes. When a user specifies a start point node and an end point node, the end point node is an incident that the user wants to access finally, and the start point node is an incident (typically, the user themselves) from which a concatenation to the end point node originates. Instead of specifying two, start point node and end point node as root nodes, the user may specify one root node. For example, when a user wishes to know an incident that is related to the document "Doc1" through a person, the user may specify one node, i.e., the document "Doc1", as a root node.

A maximum hop count limit specification receiving unit 14 receives a maximum hop count limit (that is, the maximum number of links) specified by a user. The maximum hop count limit represents a search range from a root node.

A search user interface (UI) 16 through which search conditions under which the search apparatus performs a search are input includes the root node specification receiving unit 12 and the maximum hop count limit specification receiving unit 14. The maximum hop count limit representing a search range may not necessarily be specified. If the maximum hop count limit is not specified, the search UI 16 may not necessarily include the maximum hop count limit specification receiving unit 14.

The search processing unit 20 executes the search procedure briefly described above to search for a concatenation path of relationships with a root node, which has been input from a user through the search UI 16, through a node of a specific attribute (for example, "person"). Which of various attributes to use as the "specific attribute" may be fixedly set in the search processing unit 20 or may be selected by a user, as described above. When the specific attribute is selected by a user, the search UI 16 may be provided with a UI for prompting a user to select an attribute. In this manner, when the "specific attribute" is selected by a user, the object of the predicate rdf:type in the search statements 1 to 4 to be used for searching may be a value indicating the selected attribute. A sorting unit 22 sorts (or orders) one or more concatenation paths found by the search processing unit 20 in accordance with predetermined criteria. Examples of the sorting criteria may include an order from a concatenation path having a smallest hop count.

A search result presenting unit 24 executes a process for presenting (i.e., displaying) the sorting results obtained by the sorting unit 22 to the user. The search result presenting unit 24 may display a list of one or more found concatenation paths in, for example, sorted order. However, the above presentation method is merely an example, and the sorting results may be presented using any other method.

Next, an example of the processing procedure of the search processing unit 20 will be described with reference to FIGS. 6 and 7. In this example, two, start point node and end point node are specified as root nodes by a user.

Figure 6:
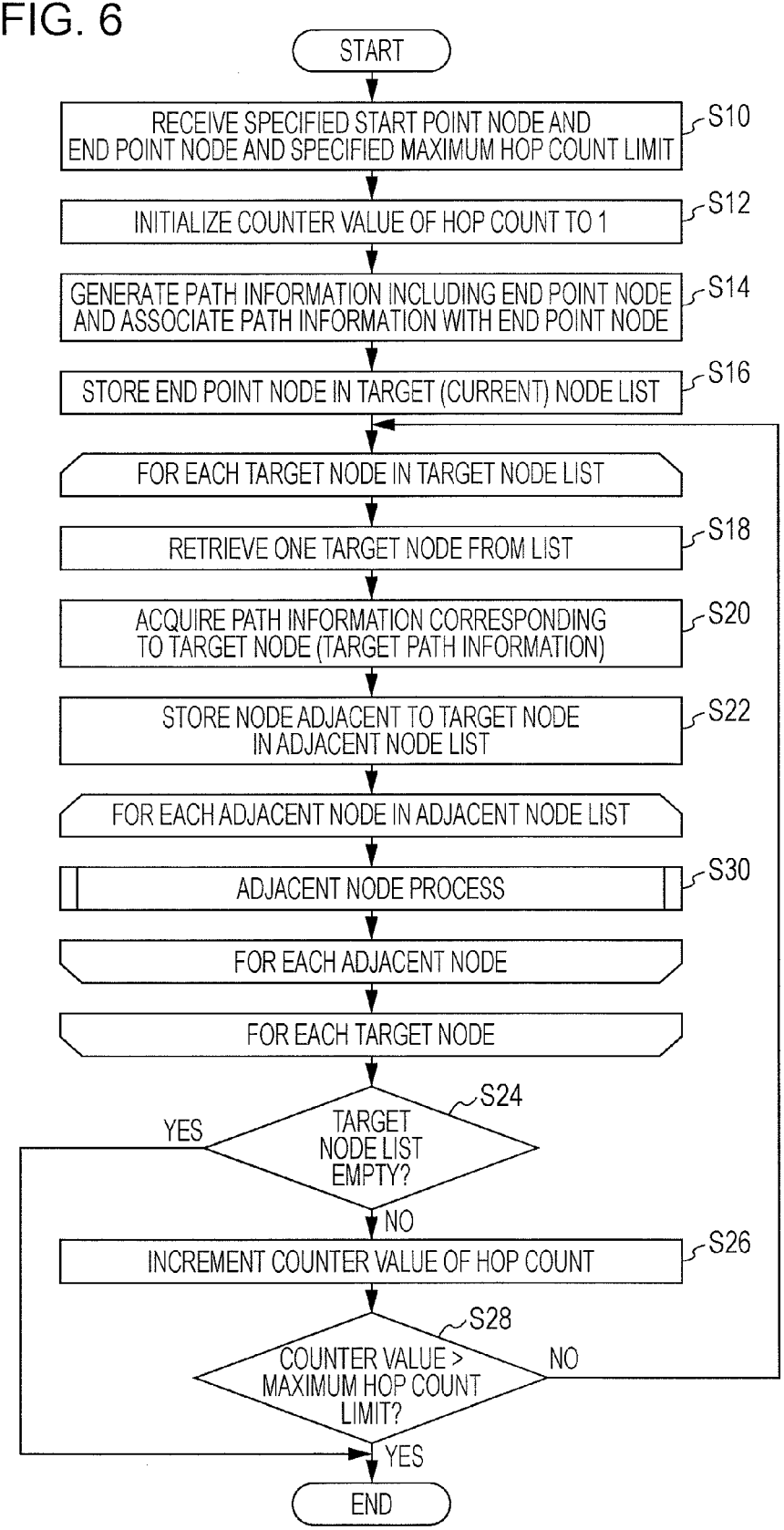
FIG. 6 is a flowchart illustrating an example of an overall processing procedure of a search processing unit.

In the illustrated procedure, as illustrated in FIG. 6, first, the root node specification receiving unit 12 in the search UI 16 receives a start point node and an end point node which have been specified by a user among nodes in a graph. In addition, the maximum hop count limit specification receiving unit 14 in the search UI 16 receives a maximum hop count limit which has been specified by the user (S10). Upon receipt of the specified nodes and the specified maximum hop count limit, the search processing unit 20 initializes the value of a counter representing the hop count to 1 (S12).

Then, the search processing unit 20 creates path information including the specified end point node, and stores the created path information in association with the specified end point node (S14). In addition, the search processing unit 20 enters the end point node in a list of target nodes (target node list) for a hop count of 1 (S16) (that is, the end point node is used as the initial target node).

The path information may be information about a line of nodes belonging to a concatenation path to be searched for which are arranged in order in which the nodes are arranged in the concatenation path. The path information may also include information about a link in the concatenation path.

Figure 7:
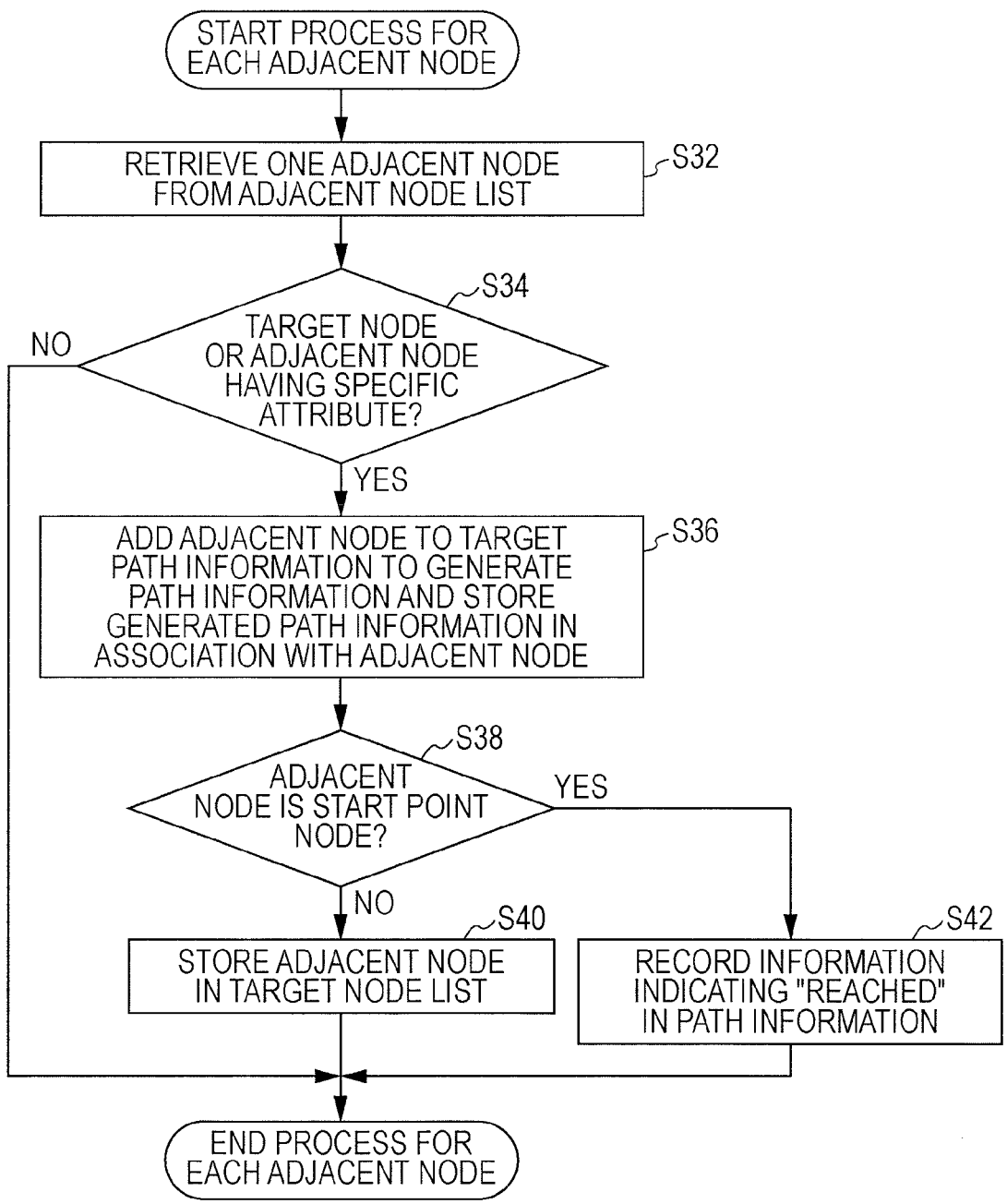
FIG. 7 is a flowchart illustrating an example of a procedure for an adjacent node process performed by the search processing unit.

In the procedure illustrated in FIGS. 6 and 7, a concatenation path is searched for, starting from the end point node, and each time an adjacent node that matches the conditions (that is, satisfies any of the search statements 1 to 4 described above) is determined, and the determined adjacent node is added to the path information. The concatenation path may branch during the search. When the concatenation path branches, path information is added to each branch.

By searching for a concatenation path, starting from the end point node that the user wants to access finally, it may be possible to present a concatenation path that is connected to the end point node set as an object even if no path concatenated to the start point node is found. Referring to the example illustrated in FIG. 3, even if a concatenation path created by concatenating relationships from the document "Doc1" as an object through persons does not reach the start point node, i.e., the person "you", you might possibly be acquainted with any of the "persons" in the concatenation path (however, being acquainted with any of the "persons" in the concatenation path might not possibly be recorded in the graph data). Thus, the presentation of such a concatenation path may be effective.

Then, the search processing unit 20 repeatedly performs the processing of S18, S20, S22, and S30 for each of nodes in a current target node list. In the flow of the foregoing description, at the current time, only the end point node is stored in the current (that is, hop count=1) target node list. Thus, first, the processing of S18, S20, S22, and S30 is performed using the end point node as a target node.

In the processing to be performed on each of the target nodes in the current target node list, first, the search processing unit 20 retrieves one unprocessed target node from the target node list (S18), and acquires the path information stored in association with the retrieved target node (S20). Then, the search processing unit 20 extracts all the nodes adjacent to the retrieved target node through a link (that is, all the nodes connected through a single link) from the graph (except the node or nodes included in the path information acquired in S20), and stores the extracted nodes (called adjacent nodes to the target node) in an adjacent node list (S22).

Then, the search processing unit 20 repeatedly performs an adjacent node process (S30) for each of the adjacent nodes in the adjacent node list.

FIG. 7 illustrates an example of the detailed procedure of the adjacent node process (S30). In the process to be performed for each adjacent node, first, the search processing unit 20 retrieves one unprocessed adjacent node from the adjacent node list (S32). Then, the search processing unit 20 determines whether or not the retrieved adjacent node or the target node has a specific attribute (in the example illustrated in FIG. 3 etc., "person") (S34). The processing of S22, S32, and S34 corresponds to processing for executing the search statements 1 to 4 described above with the target node set to <someUri>. If Yes is determined in S34, the adjacent node is added to the end of the sequence of nodes in the path information (corresponding to the target node) acquired in S20 to generate new path information, and stores the generated path information in association with the adjacent node (S36). The generated path information includes the counter value of the current hop count. This counter value represents the length of the path information (hop count) from the end point node. When the path information also contains a record about a link, the generated path information also includes information about the link connecting the target node and the adjacent node. Then, the search processing unit 20 determines whether or not the adjacent node matches the start point node specified in S10 (S38). If the adjacent node does not match the start point node, the search processing unit 20 stores the adjacent node in a target node list for the next hop count (to the current hop count as viewed from the end point node) (S40), and then ends the process. If the adjacent node matches the start point node, the search processing unit 20 records information indicating "reached" in the path information stored in association with the adjacent node (S42), and then ends the process. After the processing of S32 to S42 is completed for all the adjacent nodes adjacent to the target node, the path information corresponding to the target node may be deleted.

Through the adjacent node process (S30) described above, if the condition that any of the target node and the adjacent node has a specific attribute (for example, "person") is satisfied, the adjacent node is added to the path of a concatenation extending from the end point node to the target node. When there are plural adjacent nodes that satisfy the condition, new concatenation paths (pieces of path information), the number of which corresponds to the number of adjacent nodes, are generated.

Referring back to FIG. 6, when the processing of S18, S20, S22, and S30 is completed for all the nodes in the current target node list, the search processing unit 20 checks whether or not the target node list for the next hop count is empty (S24). If the target node list for the next hop count is not empty, the search processing unit 20 increments the counter value of the hop count by 1 (S26). Then, the search processing unit 20 determines whether or not the counter value exceeds the maximum hop count limit specified in S10 (S28). If the counter value does not exceed the maximum hop count limit, the processing of S18, S20, S22, and S30 is repeatedly performed for the target node list for the hop count indicated by the counter. If the counter value exceeds the maximum hop count limit, the search processing unit 20 stops the search operation and ends the process. If it is found in S24 that the target node list for the next hop count is empty (that is, the concatenation through nodes of the specific attribute has been interrupted), the search processing unit 20 also stops the search operation and ends the process.

Through the process illustrated in FIGS. 6 and 7, some pieces of path information about paths to which relationships are concatenated through nodes of a specific attribute as viewed from the end point node are created. FIG. 8 illustrates an example of such pieces of path information. In a table illustrated in FIG. 8, one row corresponds to a piece of path information. Each piece of path information includes information on a reach flag, the hop count, and a path from the end point node. The reach flag is a flag indicating whether or not the path of the concatenation has reached the start point node. The reach flag is set to "reached" in S42 (FIG. 7), and is set to "not reached" (or the path has not yet reached the start point node) otherwise. The hop count represents the hop count in the path of the concatenation. The path from the end point node represents a list of nodes added in S14 and S36 (and links from the target node to the respective nodes). The example illustrated in FIG. 8 corresponds to the graph illustrated in FIG. 3, the first piece of path information represents a concatenation extending from the end point node "Doc1" to the start point node "you" through the link "create", the node "Psn1" having the attribute "person", the rearward directed link "participate in" (in FIG. 8, the underline drawn under the name of a link indicates the link being directed toward the rear where the direction toward the end point node is defined as the forward direction), the node "meeting B", etc. Since the path information has reached the start point node, the value of the reach flag is set to "reached". In FIG. 8, the piece of path information in the third row is an example of a concatenation that has not reached the start point node although it is not illustrated in FIG. 3.

Figure 9:
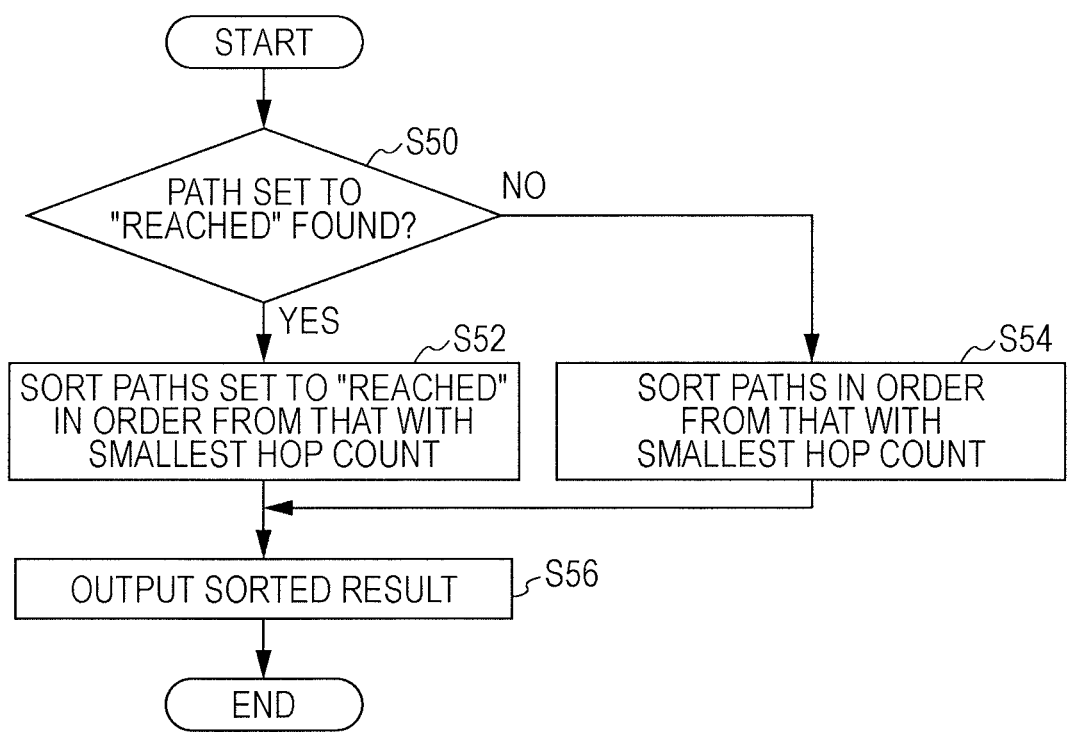
FIG. 9 is a flowchart illustrating an example of a processing procedure of a sorting unit.

Next, an example of a processing procedure of the sorting unit 22 will be described with reference to FIG. 9. The sorting unit 22 performs the process illustrated in FIG. 9 on the pieces of path information (see FIG. 8) generated by the search processing unit 20 through the process illustrated in FIGS. 6 and 7. In the process illustrated in FIG. 9, the sorting unit 22 checks whether or not the pieces of path information include a piece of path information for which the reach flag is set to "reached" (S50). If at least one piece of path information for which the reach flag is set to "reached" is found, the found one or more pieces of path information for which the reach flag is set to "reached" are sorted in order from the piece of path information with the smallest hop count (S52). That is, a concatenation path with a smaller hop count is placed at a higher rank (that is, is of higher importance). This is because the smaller the number of intervening persons, the less effort it will take to access the object (i.e., the document "Doc1"). In addition, pieces of path information for which the reach flag is set to "reached" are sorted because it may be ineffective to use a concatenation path with the reach flag set to "not reached" if a concatenation path with the reach flag set to "reached" is obtained.

If No is determined in S50, that is, if all the pieces of path information determined by the search processing unit 20 are those for which the reach flag is set to "not reached", the sorting unit 22 sorts the pieces of path information for which the reach flag is set to "not reached" in order from that with the smallest hop count (S54). Then, the sorting unit 22 outputs the sorting results obtained in S52 or S54 to the search result presenting unit 24 (S56). The search result presenting unit 24 displays the sorted concatenation paths.

An example of a processing procedure of an apparatus according to an exemplary embodiment has been described. In the example described above, a search is performed, starting from the end point node; however, a search may be performed, starting from the start point node.

In the procedure illustrated by way of example in FIGS. 6 and 7, two root nodes specified by a user, that is, the start point node and the end point node, are received. One root node may be specified by a user. In this case, the procedure illustrated in FIG. 6 may be configured such that the processing of S10 is changed to processing in which one specified root node is received, and the procedure illustrated in FIG. 7 may be configured such that the processing of S38 and S42 is omitted.

In the example described above, furthermore, when any of a target node and an adjacent node has a specific attribute, the adjacent node is incorporated into a concatenation path regardless of the type of the link between the target node and the adjacent node. However, this is merely an example. Alternatively, even in this case, the adjacent node may not be incorporated into a concatenation path unless the link between the target node and the adjacent node matches any of predetermined links. For example, in the example illustrated in FIG. 3, if at least one of a target node and an adjacent node has the specific attribute "person", for example, the adjacent node may be incorporated into a concatenation path only when the type of the link (predicate) between the target node and the adjacent node is one of "is a colleague", "participate in", and "belong to". Since links such as "is a colleague", "participate in", and "belong to" represent connections between persons, a concatenation path may be extended so as to pass through only the links of this type. However, an exception is raised when the end point node does not have the specific attribute ("person") (for example, the end point node "Doc1" illustrated in FIG. 3). In this case, if a node adjacent to the end point node has the specific attribute ("person"), the adjacent node may be incorporated into a concatenation path.

In the example described above, when a target node has a specific attribute (for example, "person"), a node adjacent to the target node is unconditionally added to the concatenation path. Alternatively, even in this case, the adjacent node may not be incorporated into the concatenation path unless the adjacent node satisfies another condition such as a condition where the adjacent node corresponds to one of a certain group of attributes.

For example, in the example illustrated in FIG. 3, the nodes "meeting B", "organization C", and "Doc1" are illustrated by way of example as nodes adjacent to the node "Psn1" having the attribute "person". Additionally, it is assumed that the person "Psn1" "created" another document (referred to as, for example, "Doc2") which is not the document "Doc1". In this case, when a search is performed, starting from the end point node "Doc1", and the "Psn1" becomes a target node, the nodes adjacent to the target node (except the preceding target node "Doc1") are "meeting B", "organization C", and "Doc2". None of these nodes has the specific attribute "person" but the target node "Psn1" has the attribute "person". Thus, in the procedure illustrated in FIG. 7, described above, these three nodes are incorporated into the respective concatenation paths. In contrast, when a target node has a specific attribute, a condition may be imposed where an adjacent node is incorporated into a concatenation path only when the adjacent node has the attribute "person", "meeting", or "organization". A node corresponding to a gathering of persons, such as "meeting" or "organization", represents the intervention of persons (for example, the persons might be participants in the meeting and might be acquainted with each other). Thus, when relationships through "persons" are kept track of, it might be possible to keep track of a human relationship even if a node having an attribute such as "meeting" is located between nodes of "person". In contrast, if there is a relationship in which another person "Psn2" "views" the document "Doc2" which the person "Psn1" "created", the persons "Psn1" and "Psn2" might or might not be acquainted with each other. For this reason, a limitation may be imposed such as incorporating a node that does not represent a "person" into a concatenation path only when the node has any of a set of attributes ("meeting", "organization", etc.) which represent an incident in which persons intervene. This limitation may prevent the node "Doc2" having an attribute "document" from being incorporated into a concatenation path.

In the example illustrated above, furthermore, the condition of having a specific attribute "person" as a condition for a concatenation is set by way of example. However, any other attribute may be used as a specific attribute.

The search apparatus described above by way of example may be implemented by, for example, allowing a general-purpose computer to execute a program that defines the processes of the functional modules described above. The computer has a circuit configuration in which hardware devices, for example, a microprocessor such as a central processing unit (CPU), a memory (primary memory) such as a random access memory (RAM) and a read-only memory (ROM), a hard disk drive (HDD) controller that controls an HDD, and a network interface that performs control to connect various input/output (I/O) interfaces to networks such as a local area network, are connected to one another via, for example, a bus. Other devices may also be connected to the bus, for example, a disk drive for reading and/or writing data from and/or to a portable disk-based recording medium such as a compact disc (CD) or a digital versatile disc (DVD) through an I/O interface, and a memory reader/writer for reading and/or writing data from and/or to a portable, non-volatile recording medium complying with various standards, such as a flash memory. A program that defines the content of the processes of the functional modules described above by way of example is stored in a fixed storage device such as a hard disk drive through a recording medium such as a CD or a DVD or through a communication medium such as a network, and is installed into a computer. The program stored in the fixed storage device is read into a RAM and is executed by a microprocessor such as a CPU, and therefore the functional modules described above by way of example may be implemented.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A search apparatus comprising:
   a graph memory that stores data of a graph having nodes, each node having an attribute selected from among a plurality of attributes, and a link which represents a relationship between the nodes;
   a root node specification receiving unit that receives a root node which is specified from among the nodes in the graph; and
   a search unit that begins with the root node as a target node, searches for an adjacent node which is connected to the target node via a link and, if at least one of the target node and the adjacent node has at least one attribute of the plurality of attributes as a search condition, the node is incorporated into a concatenation path,
   wherein the search unit iteratively performs a process of searching for an adjacent node which satisfies the search condition using a preceding adjacent node as the target node for a subsequent iteration to obtain a concatenation path, the preceding adjacent node being a node satisfying the search condition and having been determined in a previous search, and
   the search unit outputs the obtained concatenation path.

2. The search apparatus according to claim 1, wherein the search condition includes a condition in which at least one of the target node and the adjacent node has a predetermined attribute, and a condition in which a link between the target node and the adjacent node has any of at least one predetermined type.

3. The search apparatus according to claim 2, wherein
   the root node specification receiving unit receives a first specified root node and a second specified root node, and
   the search unit searches for a concatenation of adjacent nodes which satisfy the search condition, the concatenation of adjacent nodes concatenating the first specified root node to the second specified root node.

4. The search apparatus according to claim 3, wherein the search unit obtains a plurality of concatenations of adjacent nodes which satisfy the search condition, and presents the plurality of concatenations of adjacent nodes in order from one of the plurality of concatenations of adjacent nodes which has a smallest number of links.

5. The search apparatus according to claim 2, wherein the search unit obtains a plurality of concatenations of adjacent nodes which satisfy the search condition, and presents the plurality of concatenations of adjacent nodes in order from one of the plurality of concatenations of adjacent nodes which has a smallest number of links.

6. The search apparatus according to claim 1, wherein
   the root node specification receiving unit receives a first specified root node and a second specified root node, and
   the search unit searches for a concatenation of adjacent nodes which satisfy the search condition, the concatenation of adjacent nodes concatenating the first specified root node to the second specified root node.

7. The search apparatus according to claim 6, wherein the search unit obtains a plurality of concatenations of adjacent nodes which satisfy the search condition, and presents the plurality of concatenations of adjacent nodes in order from one of the plurality of concatenations of adjacent nodes which has a smallest number of links.

8. The search apparatus according to claim 1, wherein the search unit obtains a plurality of concatenations of adjacent nodes which satisfy the search condition, and presents the plurality of concatenations of adjacent nodes in order from one of the plurality of concatenations of adjacent nodes which has a smallest number of links.

9. The search apparatus according to claim 1, wherein an end node receiving unit receives an end point node, which is specified from among the nodes of the graph and is different from the root node, and
   when no concatenation path that satisfies the search condition is found beginning with the root node as target node, the search unit begins with the end point node as target node.

10. A non-transitory computer readable medium storing a program causing a computer to execute a process, the process comprising:
    storing data of a graph having nodes, each node having an attribute selected from among a plurality of attributes, and a link which represents a relationship between the nodes;

receiving a root node which is specified from among the nodes in the graph; and beginning with the root node as a target node, searching for an adjacent node which is connected to the target node via a link and, if at least one of the target node and the adjacent node has at least one attribute of the plurality of attributes as a search condition, the at least one of the target node and the adjacent node is incorporated into a concatenation path, the searching including iteratively performing a process of searching for an adjacent node which satisfies the search condition using a preceding adjacent node as the target node for a subsequent iteration to obtain a concatenation path, the preceding adjacent node being a node satisfying the search condition and having been determined in a previous search, and outputting the obtained concatenation path.

11. The computer readable medium according to claim 10, further comprising receiving an end point node, which is specified from among the nodes of the graph and is different from the root node, and when no concatenation path that satisfies the search condition is found beginning with the root node as target node, beginning the search by searching with the end point node as target node.

12. A search method comprising:

storing data of a graph having nodes, each node having an attribute selected from among a plurality of attributes, and a link which represents a relationship between the nodes;

receiving a root node which is specified from among the nodes in the graph; and beginning with the root node as a target node, searching for an adjacent node which is connected to the target node via a link and, if at least one of the target node and the adjacent node has at least one attribute of the plurality of attributes as a search condition, the at least one of the target node and the adjacent node is incorporated into a concatenation path, the searching including iteratively performing a process of searching for an adjacent node which satisfies the search condition using a preceding adjacent node as the target node for a subsequent iteration to obtain a concatenation path, the preceding adjacent node being a node satisfying the search condition and having been determined in a previous search, and outputting the obtained concatenation path.

13. The search method according to claim 12, further comprising receiving an end point node, which is specified from among the nodes of the graph and is different from the root node, and when no concatenation path that satisfies the search condition is found beginning with the root node as target node, beginning the search by searching with the end point node as target node.

* * * * *